Figure 1:
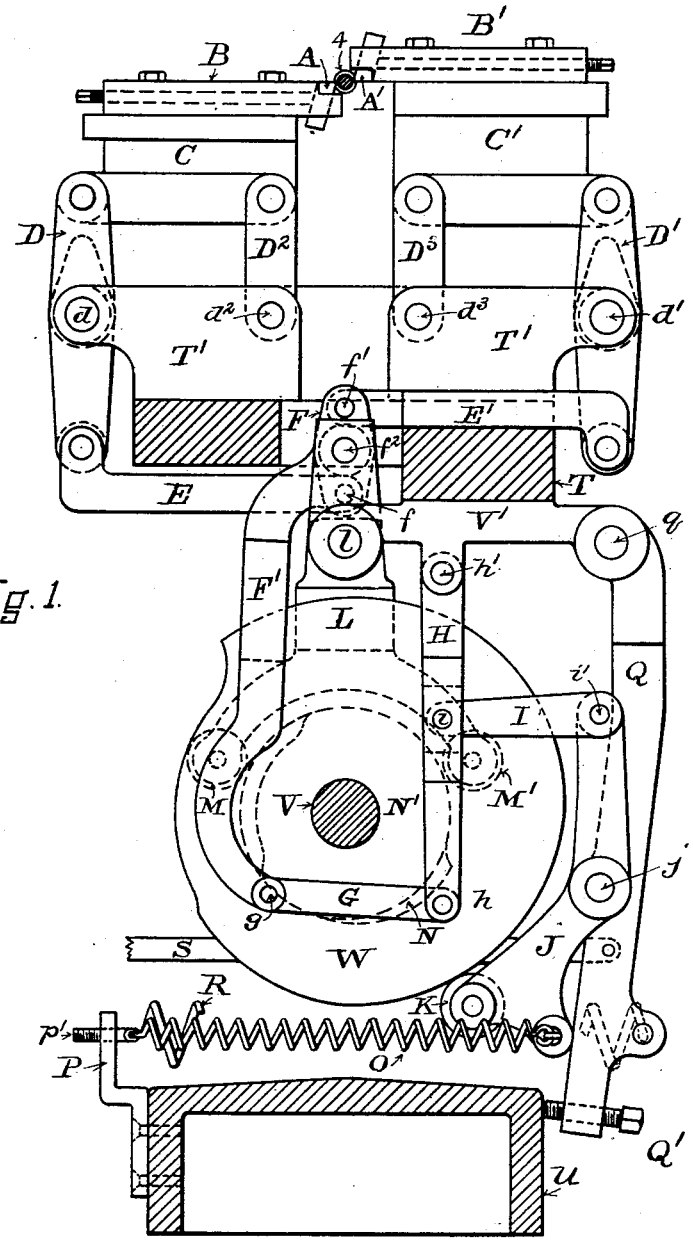

(No Model.)  E. P. NOYES.  5 Sheets—Sheet 1.
CUTTING-OFF MECHANISM.

No. 587,598.  Patented Aug. 3, 1897.

WITNESSES:
E. E. Winkley
O. E. Whyte

INVENTOR
Edward P. Noyes
BY Benjamin Phillips
ATTORNEY.

(No Model.)   5 Sheets—Sheet 3.

E. P. NOYES.
CUTTING-OFF MECHANISM.

No. 587,598. Patented Aug. 3, 1897.

WITNESSES:
E. E. Winkley
A. E. Phyto.

INVENTOR
Edward P. Noyes
BY Benjamin Philips
ATTORNEY.

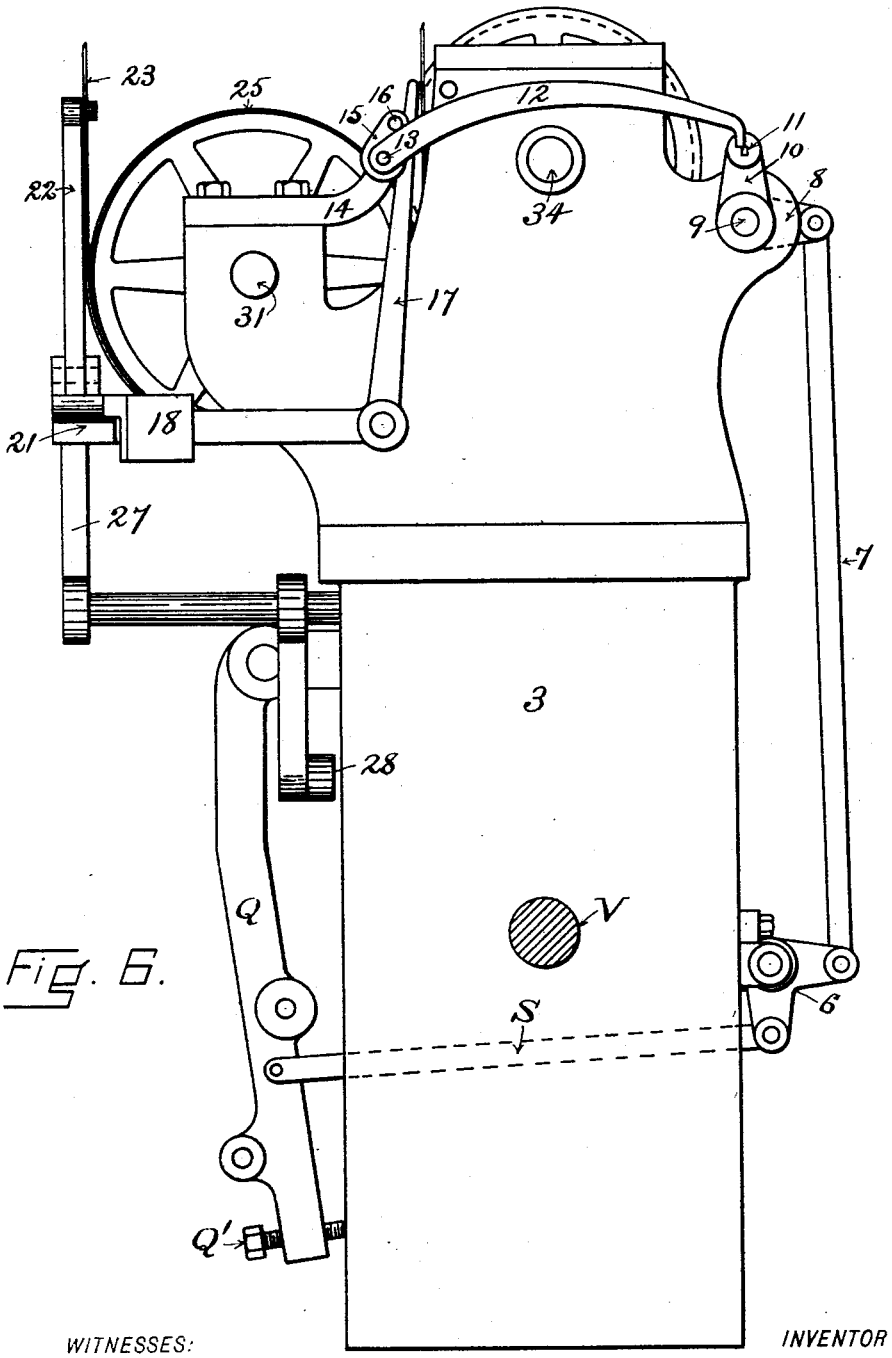

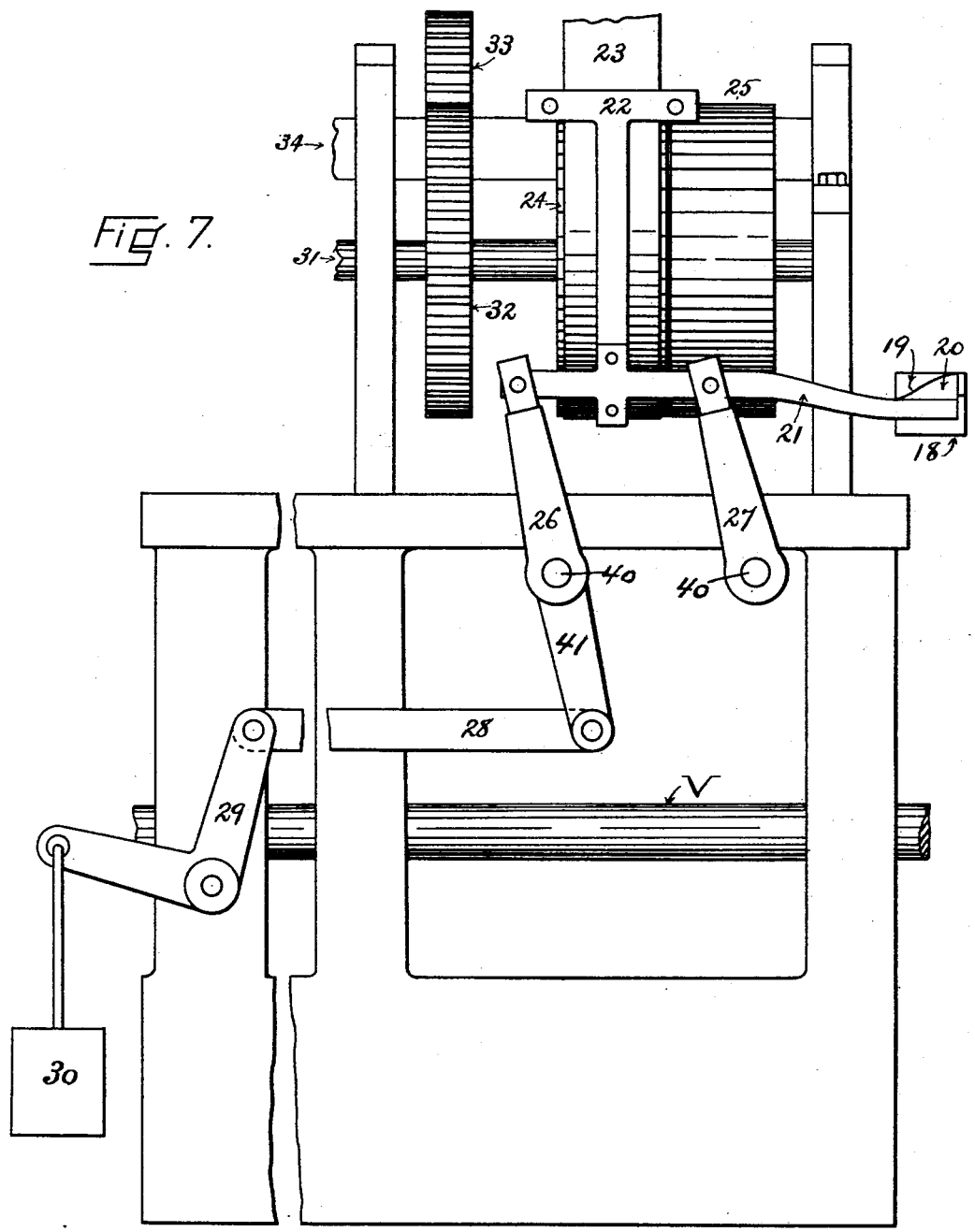

UNITED STATES PATENT OFFICE.

EDWARD P. NOYES, OF WINCHESTER, MASSACHUSETTS.

CUTTING-OFF MECHANISM.

SPECIFICATION forming part of Letters Patent No. 587,598, dated August 3, 1897.

Application filed April 30, 1896. Serial No. 589,755. (No model.)

*To all whom it may concern:*

Be it known that I, EDWARD P. NOYES, a citizen of the United States, residing at Winchester, in the county of Middlesex and State of Massachusetts, have invented a new and useful Improvement in Cutting-Off Mechanisms, of which the following, taken in connection with the accompanying drawings, is a specification.

The present invention relates to improvements in devices of the above class; and it consists of a pair of movable cutting-off tools and connected mechanisms whereby both tools are advanced toward the center of the stock to make the first portion of the cut and one tool advanced and the other retired during the latter portion of the cut, so that the final cutting-off operation is performed by a single tool.

The present invention further consists of mechanism whereby the tools are arranged to automatically adjust themselves to the work to insure the action of both tools during the first part of the cutting-off operation, of a stop mechanism and suitable connections with the cutting-off tools whereby the operation of the machine is stopped when the tools become dull or broken, and of the devices and combination of devices, as hereinafter more specifically set forth and claimed.

The present invention has for its object to provide a cutting-off mechanism which will make a smooth cut without the bur commonly found on the material after the operation of devices of this class, to insure the operation of both tools in making the first portion of the cut and thereby to save excessive wear on the cutting-off tools, to prevent injury to or breaking of the working parts of the machinery when the tools become dull or broken and refuse to perform their function, and generally to simplify the construction and increase the durability and efficiency of mechanism of this class.

A preferred form of the present invention as applied to a screw-forming machine is illustrated in the drawings herewith submitted, in which—

Figure 2:
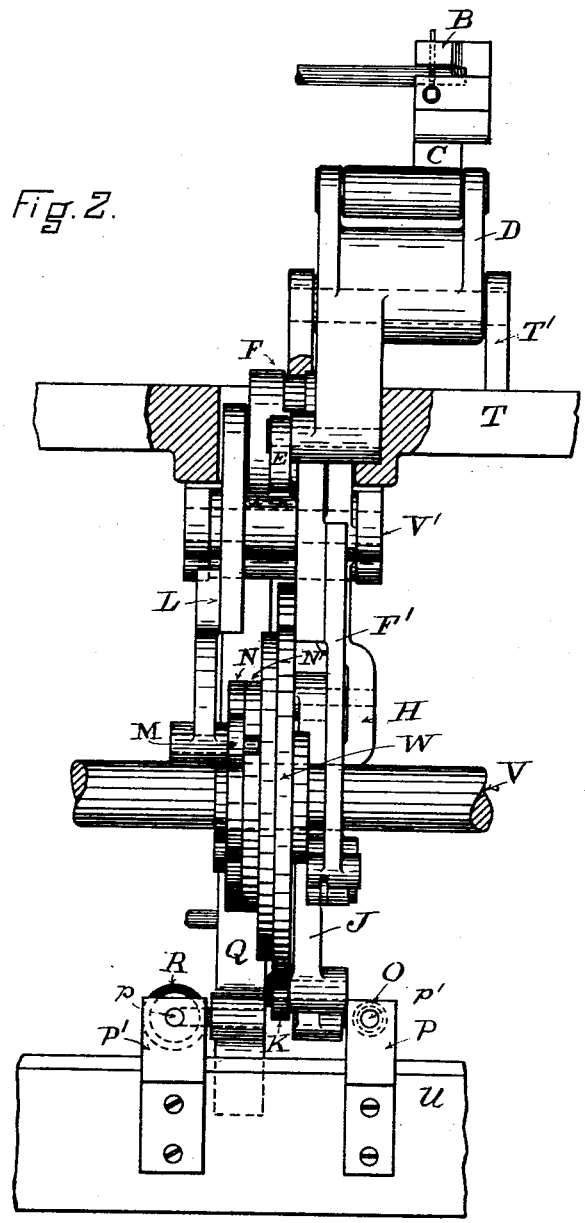
Figure 3:
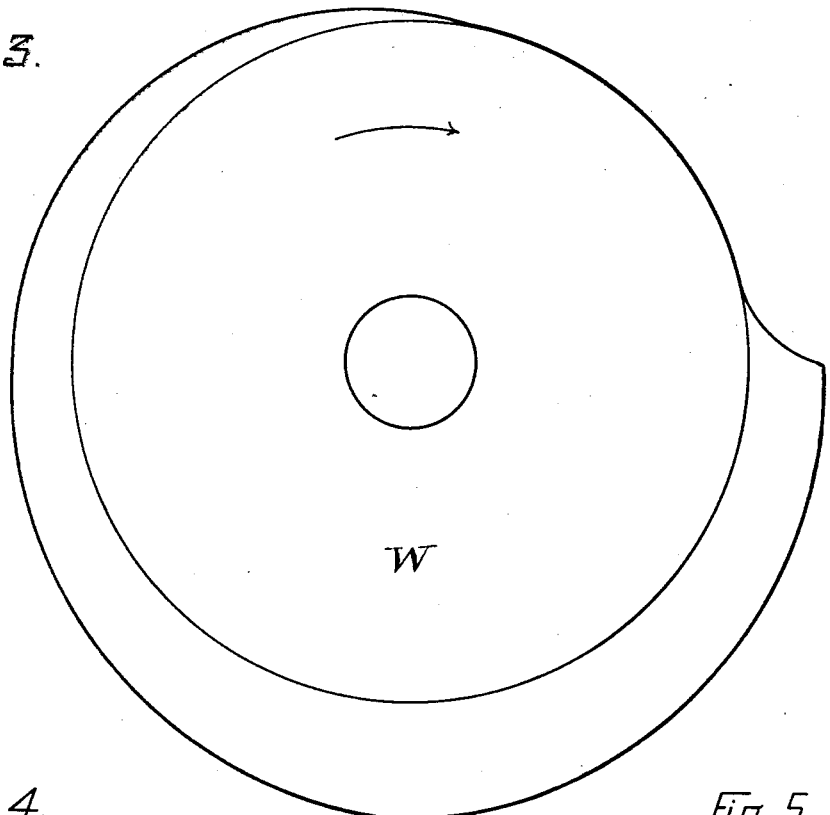
Figure 4:
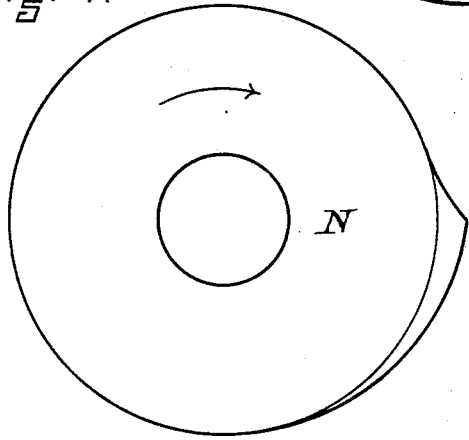
Figure 5:
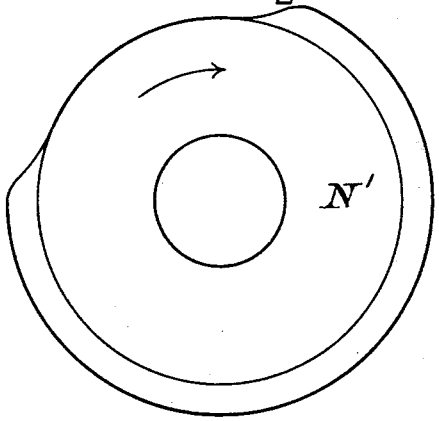

Figure 1 is a sectional view of a screw-forming machine, showing in side elevation a form of cutting-off mechanism involving the present invention. Fig. 2 is a front view of same. Figs. 3, 4, and 5 are detached views of the cams whereby the mechanism is actuated and the several parts thereof made to perform their functions in due relative order. Fig. 6 is an end view, and Fig. 7 a back view, illustrating portions of a preferred form of stop mechanism and its connection with the cutting-off tools.

In the several views above referred to parts of the mechanism of a screw-cutting machine not necessary to illustrate the present invention or its connection with said machine have been omitted to avoid confusion of parts.

I desire to say in this connection that I do not consider the present invention as limited to its application to a screw-forming machine, as the same, with slight modifications involving no departure therefrom, is applicable to other classes of machines requring means for separating portions from a longer or continuous wire or strip of material.

A and A' represent the cutting-off tools, and 4 the stock or material in which the cut is being made. In accordance with the present invention during the earlier portions of the cut both of the tools A and A' are advanced toward the axial line of the material 4, and during the later portion of the cut one of the tools A or A' is advanced, as above stated, while the other is retired, preferably at accelerated speed, so that the final cut is made by only one of the tools A and A'. The tools A and A' have during the first portion of the cutting-off operation a slight lateral play with reference to the axial line of the stock 4, so that between narrow limits they can automatically adjust themselves to the work, thereby insuring the (preferably equal) operation of both cutting-tools.

I will now describe in detail the mechanism, as shown in the drawings, whereby the results above suggested are secured, but I desire to say in this connection that I do not consider the present invention as limited thereto, as the same can be readily modified both in form and arrangement by one of average skill in the art and without any departure from the present invention.

The cutting-off tools A and A' are mounted in the tool-carriers B and B', which are bolted or otherwise suitably secured to the movable tool-carrier beds C and C'. The tool-carrier beds are supported by the pivoted levers D D² and D' D³, which are fulcrumed at $d$ $d^2$ and $d'$ $d^3$ upon the bed T or suitable brackets T' T' mounted thereon. The bed T is suitably secured to or may conveniently form a part of the frame 3. The above-described arrangement is such that a swinging motion of the pivoted levers D D² and D' D³ imparts a horizontally-reciprocating motion to the movable tool-carrier beds C and C'.

The levers D D² and D' D³ may be conveniently actuated as follows: The lever D is projected below its fulcrum $d$, and the lever D' below its fulcrum $d'$. To the lever D, below its fulcrum $d$, is pivoted the link E, and to the lever D' is similarly connected a link E'. The link E is pivotally connected at $f$ with the swinging lever F, and the link E' is similarly connected with the lever F at $f'$, the lever F being intermediately fulcrumed at $f^2$ upon a movable support or lever L, as hereinafter more fully described.

From the lever F is projected the laterally and downwardly bent arm F', to which at $g$ is pivoted a link G, which is pivoted at $h$ to the swinging lever H, centered at $h'$ on the frame 3 or a suitable bracket V' secured thereto. To the lever H at $i$ is pivoted a link I, which is similarly connected at $i'$ with the swinging lever J, which is fulcrumed at $j$ on the swinging lever Q, the lever Q being centered at $q$ on the bracket V'.

The lever J is extended below its fulcrum $j$ and at its lower end carries a cam-roll K, which bears upon the periphery-cam W, the form of which will be hereinafter more specifically described. The cam W is mounted upon and rotates with the cam-shaft V, which is a shaft in operative connection with the power-shaft of the machine. A spring R, secured at one end to the lever Q and at the other end preferably to a lug P' on the base U of the frame 3, acts to hold the lower end of lever Q against a fixed support, preferably the base U. An adjustment-screw Q' is conveniently provided near the lower end of the lever Q, by means of which the position of the lever Q with reference to the center of cam W, and hence the position of fulcrum $j$ of lever J, may be regulated to secure the successful operation of the device, as hereinafter described. Another spring O, connected to the lever J and the lug P, acts to hold the cam-roll K in contact with the cam W during the rotation of the cam W. In practice I have connected the springs R and O to the lugs P and P' by means of adjustment-screws $p$ and $p'$, by means of which the desired tension may be secured upon the springs R and O.

The above-described arrangement is such that if the tools A and A' are in proper condition to make the cut during the rotation of cam W when its more eccentric portions are brought in contact with the roll K they force the roll K to the right against the tension of the spring O, the tension of spring R being sufficient to hold the lever Q in its original position. The movement of the roll K to the right by means of the lever J and link I moves the points $i$ and $i'$ to the left and by means of lever H and link G moves the points $h$ and $g$ to the left, which by means of the arm F' turns the lever F about its center $f^2$, moving the point $f'$ to the right and the point $f$ to the left. The movement of the point $f$ to the left by means of the link E and lever D moves the tool-carrier bed C to the right. The movement of the point $f'$ to the right by means of link E' and lever D' moves the tool-carrier bed C' to the left. The left-and-right movement of the tool-carrier beds C and C', as above described, causes said tool-carrier beds to approach each other and the cutting-off tools A and A', mounted in the tool-carriers B and B', to advance toward the axial line of the stock 4. As the less eccentric portions of cam W reach the roll K the spring O acting thereon moves the same to the left, and the motions above described are reversed and the tools A and A' retired.

If the tools A or A', or either of them, should be dull or broken or for any other reason unable to enter the work or to continue their advance toward the center of the stock, the movement of the levers D and D' will be stopped, and consequently the movement of lever F and of its arm F', which will prevent any movement to the left of points $g$, $h$, $i$, and $i'$. If under the above conditions the cam W still acts to force the roll K farther to the right, the tension of the spring R will be overcome and the lever Q moved to the right, and by means of suitable connecting mechanism connecting the lever Q with the belt-shifter or other suitable stop mechanism, as hereinafter described, the operation of the machine will be stopped.

As hereinbefore stated, the lever F is fulcrumed at $f^2$ on the lever L. The lever L is fulcrumed at 1 on the frame 3 or a suitable bracket V' mounted thereon. The lever L extends below its fulcrum $b$, and its lower end is forked and carries the cam-rolls M and M', the cam-roll M being arranged to be acted upon by the cam N and the cam-roll M' by the cam N', both of the cams N and N' being mounted upon and rotating with the cam-shaft V. The above-described arrangement is such that the rotation of the cams N and N' effects an oscillation of the lever L and of the center $f^2$, and by moving the links E E' and levers D D' in the same direction effects a movement of the tool-carrier beds C and C' in the same direction, which advances one of the tools A or A' toward the center of the stock while the other is retired from the same, preferably, and in the above-described construction, at relatively quicker speed.

I prefer to use the two cams N and N' to secure the movement above suggested since such arrangement insures a positive operation, but I do not consider the present invention as in any way limited thereto.

It will be noted that, as shown in the drawings, the rolls M and M' are not held in contact with the circular portions of cams N and N', but a slight play is allowed between each roll and cam.

The object of the above-described construction is to allow the cutting-off tools A and A' to adjust themselves automatically to the work and insure the operation of both tools in making the first part of the cut, as will be hereinafter more fully described.

I will now describe the mechanism connecting the lever Q with the belt-shifter whereby the operation of the machine is stopped when a tool becomes dull or broken; but before doing so I desire to say that the same forms no essential feature of the present invention and that any suitable form of stop mechanism may be substituted therefor without any departure from the present invention.

The lever Q is connected by the link S with one arm of a bell-lever 6, pivoted at its angle to the frame 3. The other arm of the bell-lever 6 is connected by the pivotal connecting-rod 7 with an arm 8, projecting from a rod 9, having suitable bearing in frame 3. Rigidly projected from the rod 9 is an arm 10, upon which is formed the laterally-projecting stud 11, upon which rests one end of a lever 12, which is pivoted at 13, at or near the opposite end, to a suitable support 14 on the frame 3.

From the lever 12 projects an arm 15, which carries a stud 16, which bears against the bent lever 17, pivoted at its angle on the frame 3. The bent lever 17 carries a block 18, which serves as a counterweight and upon the outer end of which is formed a recess or notch 19, in which engages a projection 20 on the rod 21, to which is secured the belt-shifter 22, by means of which the belt 23 may be shifted from the fast pulley 24 to the loose pulley 25. The rod 21 is supported by the swinging levers 26 and 27, which are mounted upon and rotate with the rods 40 40, which are held in suitable bearings in the frame 3, in which they are free to rotate. Depending from one of the rods 40 is an arm 41, which rotates with rod 40 and which is connected by the link 28 with one of the bell-levers 29, pivoted at its angle to the frame 3, and the other arm of which carries a weight 30.

The operation of the device above described is as follows: When the lever Q is moved to the right, as before described, the link S, acting through the bell-lever 6, the rod 7, and the arm 8, turns the arm 10, moving the stud 11 out from beneath the lever 12, which is allowed to fall. As the lever 12 falls the arm 15, by means of the stud 16, acts upon the bent lever 17 to raise the weight 18, clearing the projection 20 from the notch 19 and allowing the rod 21 to be moved over by the action of weight 30 and by means of the belt-shifter 22 to shift the belt from the fast pulley 24 to the loose pulley 25. When desired to start the machine, the rod 21 is drawn back until the projection 20 engages with the notch 19 by the operator, the lever 12 being again set upon its rest 11.

It is perhaps unnecessary to add that the shaft 31 is the power-shaft of the machine, connected by the gears 32 and 33 with the mandrel-shaft 34 and by suitable connections (not shown) with the cam-shaft V.

The cams W, N, and N' are so formed and timed with reference to each other that the several mechanisms actuated thereby perform their functions in due relative order.

A preferred form of the cams W, N, and N' is shown in Figs. 3, 4, and 5 of the drawings, and such form will be clearly understood by reference to the descriptions of the operation of my improved cutting-off mechanism as hereinafter given.

The operation of the several features of the present invention has already been described fully in connection with the description of their form and arrangement and it is only necessary to add thereto a brief description of their united operation.

Presuming that the tools A and A' are in condition to make the cut and that the time has arrived in the operation of the screw-cutting machine for cutting off the screw, the cams W, N, and N' are so formed and timed with reference to each other that the cam W, acting upon the cam-roll K, advances the cutters A and A' toward the center of the stock while the circular portion of the cams N and N' is passing the cam-rolls M and M', so that no oscillation is imparted to the lever L thereby; but if either of the tools A or A' is advanced before the other the play between the rolls M and M' and the circular portions of cams N and N' will allow the lever L to be swung slightly to either side, moving over the center $f^2$ and allowing the tools A and A' to adjust themselves upon the stock, so that both act to make the cut. The cam W continues to act upon the roll K to advance the tools A and A', and cams N and N' continue to turn by the rolls M and M' without motion of the lever L, except to accomplish the automatic adjustment of the tools, as above stated, until the tools A and A' have advanced nearly to the center of the stock, when the projected portion of cam N reaches the cam-roll M, and at the same time the cut-away portion of the cam N' reaches the roll M' and the lever L is moved to the left, moving the center $f^2$ to the right. This movement of the center $f^2$ to the right moves both of the tools A and A' to the left, causing the tool A' to advance farther and cut off the stock while the tool A is withdrawn. The cycle is completed when the roll K drops back to its starting-point, thus withdrawing both tools A and A'.

The operation of the stop mechanism and its connection with the cutting-off tools has already been sufficiently described. I would say that I am aware of the state of the art as shown in United States Letter Patent to Stehli, No. 351,291, dated October 19, 1896, and also to Hillman, No. 462,553, dated November 3, 1891, and claim nothing shown therein. I, however, do not consider the present invention limited to the details of mechanism herein shown and described; but

I claim as novel and desire to secure by Letters Patent of the United States—

1. In a cutting-off mechanism the combination of two movable cutting-off tools, mechanism operating during the first part of the cut to advance both tools toward the center of the stock, and connected mechanism operating automatically during the last part of the cut to advance one tool and retire the other whereby the final cut is made with a single tool, substantially as described.

2. In a cutting-off mechanism the combination of two movable cutting-off tools, and connected mechanism for advancing both tools toward the center of the stock having provision for a slight lateral play of the tools, with reference to the axial line of the stock, to insure the operation of both tools in making the cut, substantially as described.

3. In a cutting-off mechanism the combination of two movable cutting-off tools adapted to operate upon opposite sides of the stock, mechanism operating during the first part of the cut to move both tools substantially simultaneously in opposite directions and connected mechanism operating during the last part of the cut to move both tools substantially simultaneously in the same direction, whereby the first part of the cut is made with both tools and the final cut with a single tool, substantially as described.

4. In a cutting-off mechanism, the combination of two movable cutting-off tools, connected mechanism for advancing both tools toward the center of the stock having provision for a slight lateral play of the tools with reference to the axial line of the stock, a stop mechanism and connections between each of said tools and the stop mechanism, whereby when the advancement of either tool is impeded the stop mechanism is operated to stop the advance of both tools, substantially as described.

5. In a cutting-off mechanism the combination of two movable cutting-off tools, a lever for actuating the cutting-off tools fulcrumed on a movable support, mechanism for actuating the lever, and connected mechanism for actuating its movable support, substantially as described.

6. In a cutting-off mechanism the combination of two movable cutting-off tools, pivoted levers for actuating the tools fulcrumed on a fixed support, a pivoted lever for actuating the tool-actuating levers fulcrumed on a movable support, mechanism for actuating the last-named lever, and connected mechanism for actuating its movable support, substantially as described.

In testimony whereof I have hereunto set my hand, in the presence of two attesting witnesses, this 28th day of April, 1896.

EDWARD P. NOYES.

Witnesses:
WILLIAM A. SARGENT,
JOSEPH WARREN.